United States Patent

Taylor

[11] 3,880,033
[45] Apr. 29, 1975

[54] ROTARY SHEAR ASSEMBLY

[75] Inventor: Donald R. Taylor, Haddonfield, N.J.

[73] Assignee: Molins Machine Company, Inc., Camden, N.J.

[22] Filed: June 26, 1973

[21] Appl. No.: 373,722

[52] U.S. Cl. .................. 83/104; 83/106; 83/157; 83/158
[51] Int. Cl. .................. B26d 1/40; B65h 35/08
[58] Field of Search ............. 83/106, 158, 157, 104, 83/105, 295, 298, 339, 296

[56] References Cited
UNITED STATES PATENTS

| | | | |
|---|---|---|---|
| 1,808,396 | 6/1931 | Biggert, Jr. et al. | 83/104 |
| 2,229,638 | 1/1941 | Chamberlin et al. | 83/106 |
| 3,029,675 | 4/1962 | Alexander et al. | 83/298 X |
| 3,169,428 | 2/1965 | Owen | 83/106 X |
| 3,264,917 | 8/1966 | Califano et al. | 83/106 X |
| 3,307,441 | 3/1967 | Saunders et al. | 83/106 X |
| 3,408,886 | 11/1968 | David | 83/157 X |
| 3,477,323 | 11/1969 | Osborn | 83/106 X |
| 3,489,043 | 1/1970 | Dent | 83/105 X |
| 3,628,410 | 12/1971 | Shields | 83/296 X |
| 3,742,798 | 7/1973 | Gries | 83/298 |

Primary Examiner—Frank T. Yost
Attorney, Agent, or Firm—Seidel, Gonda & Goldhammer

[57] ABSTRACT

A corrugator for making corrugated paperboard is provided with a rotary shear assembly between the double facer machine and the slitter-scorer to cut the web transversely into sheets.

6 Claims, 3 Drawing Figures

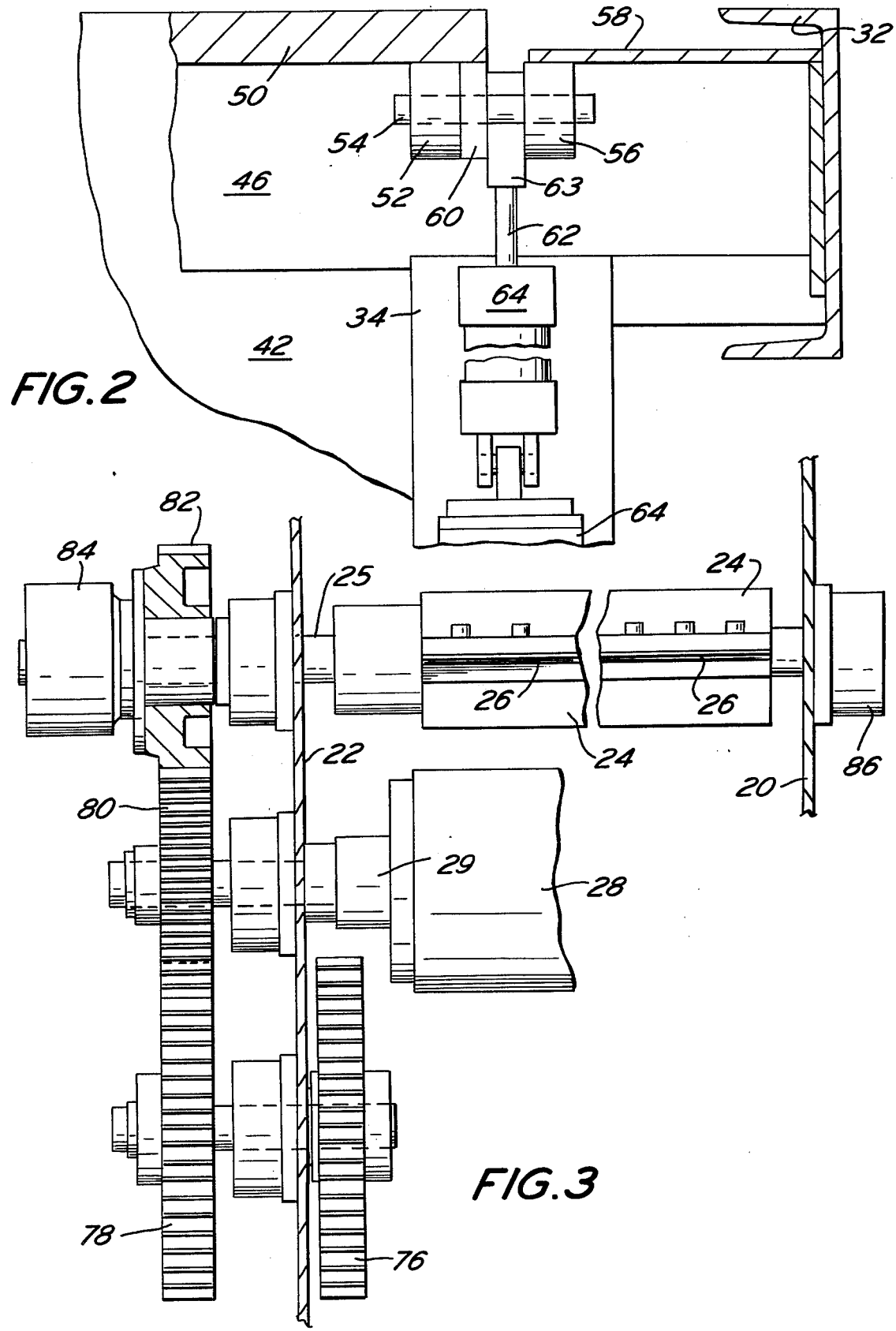

ROTARY SHEAR ASSEMBLY

Heretofore, a corrugator for making corrugated paperboard was provided with a single blade manually operable shear for cutting the web transversely. Thereafter, the upstream and downstream ends of the corrugator were operated at different speeds so as to create a gap in the web. When the gap reached the slitter-scorer, and/or cut off, appropriate changes were made for a new production run.

In accordance with the present invention, between the double facer machine and the slitter-scorer, there is provided a rotary shear assembly for repetitively cutting the web transversely into sheets without materially changing the speed of the web or the upstream and downstream ends of the corrugator. While the rotary shear assembly is cutting the web transversely into sheets which are discharged into a collection area which may include a conveyor, the necessary changes are made at the slitter-scorer and/or cut off. The time period involved may be between three and sixty seconds. Thereafter, the rotary shear is rendered inoperative and the web is fed in the usual manner.

The rotary shear assembly may be utilized to transversely cut the web into sheets for purposes other than for making necessary changes for a new production run. Other purposes for using the rotary shear assembly include removing the splice between webs, obtaining and removing specimens of the web for test purposes, etc. The sheets that are produced by the rotary shear assembly cutting the web may be used for a wide variety of purposes such as for top and bottom liners for a pallet of cut sheets.

It is an object of the present invention to provide a novel rotary shear assembly for use between the double facer and slitter-scorer in a corrugator for making corrugated paperboard.

It is another object of the present invention to provide a rotary shear assembly for transversely and repetitively cutting the web and removing the sheet or sheets cut from the web.

It is another object of the present invention to provide a rotary shear assembly for transversely cutting a continuously moving web to create a gap in the web for purposes of providing the time necessary to make adjustments on the slitter-scorer for the next production run.

Other objects will appear hereinafter.

For the purpose of illustrating the invention, there is shown in the drawing a form which is presently preferred; it being understood, however, that this invention is not limited to the precise arrangements and instrumentalities shown.

FIG. 2 is a sectional view taken along the line 2—2 in FIG. 1.

FIG. 3 is a sectional view taken along the line 3—3 in FIG. 1.

Figure 1:
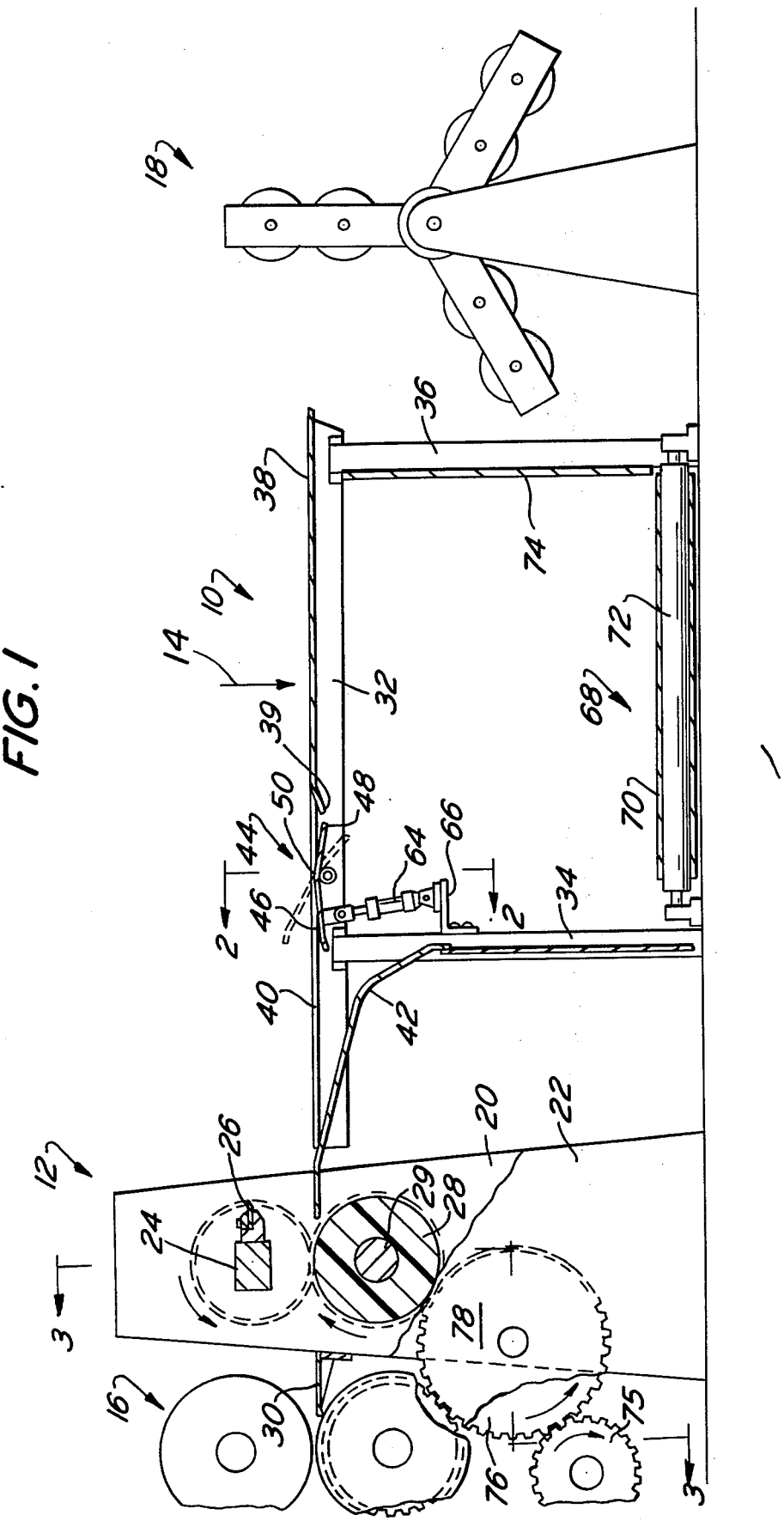
FIG. 1 is an elevation view of the present invention partly in section.

Referring to the drawing in detail, wherein like numerals indicate like elements, there is shown in FIG. 1 a rotary shear assembly in accordance with the present invention designated generally as 10. The assembly 10 includes a rotary shear 12 and a table 14 disposed between a conventional double facer machine 16 and a conventional slitter-scorer 18.

The rotary shear 12 includes upright side frames 20 and 22 corresponding to the width of the corrugator. The side frames 20 and 22 rotatably support a shear roll 24 mounted on a shaft 25. Shear roll 24 is provided with a cutting blade 26. Opposite the shear roll 24, there is provided an anvil roll 28 mounted on shaft 29. The anvil roll 28 may be made entirely from a polymeric plastic material or may be made from a metal roller coated with a layer of polymeric plastic material on its periphery. The anvil roll 28 rotates continuously at the paper web speed. The shear roll 24 operates intermittently on command.

On the double facer side of the rotary shear 12, the side frames support a platform 30 which projects towards the discharge end of the double facer machine 16. The table 14 includes a frame 32 which may be made of channel-shaped members mounted on upright posts 34, 36 on opposite sides of the table 14. The downstream end of the table 14 includes a support surface 38 having its leading edge identified as 39. A gap 40 is provided between the leading edge 39 and the outlet side of the rotary shear 12. The gap 40 extends across the full width of table 14. Below the plane of the surface 38 and the gap 40, there is provided a wall 42 which is inclined downwardly in the direction of web travel which is from left to right in FIG. 1. Wall 42 is supported by the frame 32 and the upright posts 34.

A diverter 44 is supported by the frame 32 immediately in front of the leading edge 39. The diverter 44 includes a forward portion 46 and a trailing portion 48 which converge upwardly to a crest 50. The portions 46 and 48 are rotatably supported for rotation about a horizontal transverse axis.

Referring to FIG. 2, it will be noted that a bearing 52 is secured to the portions 46, 48 adjacent the crest 50 on the lower surface thereof. A pin 54 extends through the bearing 52 and through a bearing 56 on bracket 58. Bracket 58 is secured to the frame 32. Between the bearings 52 and 56, there is provided an ear 60. The ear 60 is fixedly secured to the forward portion 46.

A flat plate 63 is pivotably connected to the ear 60. Plate 63 is also rigidly coupled to one end of a piston rod 62. The other end of piston rod 62 extends into cylinder 64 and is connected to a piston therein. Motive fluid is selectively introduced into cylinder 64 to actuate said piston. The cylinder 64 is pivotably connected to bracket 66 on the upright post 34. Actuation of the piston in cylinder 64 causes the diverter 44 to pivot upwardly or downwardly about the axis of pin 54 from the solid line position shown in FIG. 1 to the phantom position shown in FIG. 1. The portions 46 and 48 extend across the full width of the table 14.

Below the table 14, there is provided a conveyor 68 in a receiving section forwardly of the transverse wall 74. The conveyor 68 includes a roller 72 around which extends an endless belt 70. The conveyor 68 is adapted to transport accumulated cut sheets in a direction perpendicular to the direction of movement of the web.

The side frame 22 of the rotary shear 12 rotatably supports a gear 76 driven by a gear 75 from the double facer machine 16. A gear 78 is mounted on a common shaft with the gear 76. Gear 78 meshes with gear 80.

The gear 80 is mounted on the shaft 29 coaxial with the anvil roller 28 and rotatably drives the same. Gear 80 meshes with gear 82 mounted on shaft 25 with rotary bearings therebetween. There is no direct connection between gear 82 and shaft 25 which supports the shear roller 24. Gear 82 is coupled to the shaft 25 by way of electric clutch 84. A brake 86 is coupled to the shaft 25 on the opposite end thereof from the clutch 84.

The clutch 84 and brake 86 are operated alternately. When the clutch 84 is operative and gear 82 is coupled to shaft 25, the brake 86 is inoperative and vice versa. Brake 86 causes the shear roll 24 to come to a stop position with the blade 26 in the position as shown in FIG. 1. Gears 75, 76, 78, 80 and 82 are chosen so that the anvil roller 28 continuously rotates at web speed. The shear roll 24 starts from a stationary position as illustrated in FIG. 1 and assumes web speed at the time a sheet is cut from the web by blade 26 and continues in synchronous relationship until clutch 84 is deactivated.

Whenever it is desired to remove sheets from the web, it is possible to do so with the rotary shear assembly 10 of the present invention without changing the speed of either the upstream or the downstream portion of the corrugator. It is only necessary to render the clutch 84 operative, release the brake 86, and activate the piston in cylinder 64. The web will be repetitively cut into sheets. The sheets will fall through the opening or gap 40 and be directed by wall 42 downwardly onto the conveyor 68. If desired, the repetitive cutting of the web may be for a sufficient length of time so that the slitter-scorer 18 may be adjusted for the next production run.

When it is desired to resume processing of the web, the clutch 84 is rendered inoperative, the brake 86 is applied to cause the shear roll 24 to stop in the position shown in FIG. 1, and the cylinder 64 rendered inoperative. When the cylinder 64 is rendered inoperative, the diverter 44 moves from the phantom position in FIG. 1 to the solid line position in FIG. 1. The oncoming web rides across the crest 50 of the diverter 44 onto the surface 38 and then is subsequently processed in a conventional manner. The forward portion 46 of the diverter 44, when in a solid line position as shown in FIG. 1, cams upwardly the leading edge of the web. The sheets accumulated on the conveyor 68 may be removed in a direction transverse to the corrugator at any convenient time.

The present invention may be embodied in other specific forms without departing from the spirit or essential attributes thereof and, accordingly, reference should be made to the appended claims, rather than to the foregoing specification as indicating the scope of the invention.

I claim:

1. Apparatus comprising a rotary shear assembly positioned between a double facer machine and a slitter-scorer of a corrugator, said assembly comprising a rotary shear at the upstream end of the assembly and a frame having a web support surface at the downstream end of the assembly, said rotary shear including a rotatably mounted cutting blade for repetitively cutting a web transversely into sheets, means for receiving sheets cut by the rotary shear, a diverter supported by said frame downstream from the rotary shear, said diverter being mounted for movement from an inoperative position wherein it does not interfere with normal passage of a web to an operative position wherein it prevents sheets from moving along a path normally followed by a web, said surface being spaced from the downstream end of the rotary shear by a gap, said gap being upstream from the diverter, said sheet receiving means being below said surface, said diverter having forward and rear portions converging to a crest, and means coupled to said diverter for pivoting said diverter about a horizontal transverse axis adjacent said crest.

2. Apparatus comprising a rotary shear assembly positioned between a double facer machine and a slitter-scorer of a corrugator, said assembly including a rotary shear at the upstream end of the assembbly adjacent said double facer machine and a web support surface at the downstream end of the assembly, said surface being spaced from the downstream end of the rotary shear by a gap, said rotary shear including a rotatably mounted shear roll having a cutting blade for selectively and repetitively cutting the web transversely into sheets, means below the elevation of said surface for receiving sheets cut by the rotary shear, a diverter between said surface and said rotary shear, said diverter mounted for movement from an inoperative position where it does not interfere with normal passage of a web to an operative position wherein it projects above the elevation of said surface to prevent sheets from moving along a path normally followed by a web, a sloping wall extending from the downstream end of the rotary shear and below the elevation of the gap for directing sheets toward said sheet receiving means, said diverter having forward and rear portions converging to a crest, and means coupled to said diverter for pivoting said diverter about a horizontal transverse axis adjacent said crest.

3. Apparatus in accordance with claim 2 wherein said means for receiving sheets includes a conveyor for conveying the sheets in a direction parallel to the axis of said shear roll.

4. Rotary shear assembly in accordance with claim 2 including a sloping wall extending from the downstream end of the rotary shear and below the elevation of the gap for directing sheets to said sheet receiving means.

5. Rotary shear assembly in accordance with claim 2 wherein said means below the elevation of said surface for receiving sheets includes a conveyor below said surface for conveying the sheets in a direction parallel to said axis.

6. Rotary shear assembly in accordance with claim 2 including an anvil roll for continuous rotatably contact with the web below and in cooperating relation with said shear roll.

* * * * *